(12) United States Patent
Zhang et al.

(10) Patent No.: US 8,251,333 B1
(45) Date of Patent: Aug. 28, 2012

(54) SUPPORTING APPARATUS

(75) Inventors: Guang-Yi Zhang, Shenzhen (CN); Hai-Chen Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 8 days.

(21) Appl. No.: 13/100,300

(22) Filed: May 4, 2011

(30) Foreign Application Priority Data

Apr. 12, 2011 (CN) .......................... 2011 1 0090420

(51) Int. Cl.
*A47B 91/00* (2006.01)
(52) U.S. Cl. .................. 248/346.3; 248/222.11; 248/73; 292/2; 292/32; 361/679.31
(58) Field of Classification Search ............. 248/222.11, 248/27.3, 221.11, 65, 73, 223.1, 223.2; 361/679.31, 361/679.37, 724, 725, 726, 727; 292/2, 32, 292/33, 37, 41, 44, 45, 47, 49, 53, 57, 59, 292/137, 156, 157, 159, 138, 140, 194, 213, 292/215, 195, 197, DIG. 11, DIG. 37
See application file for complete search history.

(56) References Cited

U.S. PATENT DOCUMENTS

| | | | | |
|---|---|---|---|---|
| 6,556,432 B2 * | 4/2003 | Chen et al. | ............... | 361/679.33 |
| 6,614,651 B2 * | 9/2003 | Chi et al. | ................. | 361/679.02 |
| 7,365,970 B2 * | 4/2008 | Cheng et al. | ............ | 361/679.55 |
| 7,440,272 B2 * | 10/2008 | Chen et al. | ............... | 361/679.33 |
| 7,614,672 B2 * | 11/2009 | Smith et al. | ................ | 292/336.3 |
| 7,637,540 B2 * | 12/2009 | Chiang | ........................... | 292/45 |
| 7,934,607 B2 * | 5/2011 | Henderson et al. | ............ | 211/26 |
| 8,070,243 B2 * | 12/2011 | Chen et al. | ................. | 312/223.2 |
| 8,109,541 B2 * | 2/2012 | Chang et al. | ..................... | 292/95 |
| 2008/0136298 A1 * | 6/2008 | Xiao | .......................... | 312/223.2 |
| 2010/0294905 A1 * | 11/2010 | Peng et al. | ............... | 248/222.12 |

\* cited by examiner

*Primary Examiner* — Terrell McKinnon
*Assistant Examiner* — Monica Millner
(74) *Attorney, Agent, or Firm* — Altis Law Group, Inc.

(57) ABSTRACT

A supporting apparatus includes a supporting member, two movable members slidably received in the supporting member, and a pivot member pivotably attached to the supporting member and arranged between the movable members. Wherein when one of the movable members is operated to move relative to the supporting member, the movable member drives the pivot member to pivot, the pivot member drives the other movable member to move.

16 Claims, 4 Drawing Sheets

SUPPORTING APPARATUS

BACKGROUND

1. Technical Field

The disclosure relates to a supporting apparatus for servers or desktop computers.

2. Description of Related Art

A server or desktop computer is often set on a supporting apparatus with non-contractible structure. When not in use, a supporting apparatus just takes up space.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
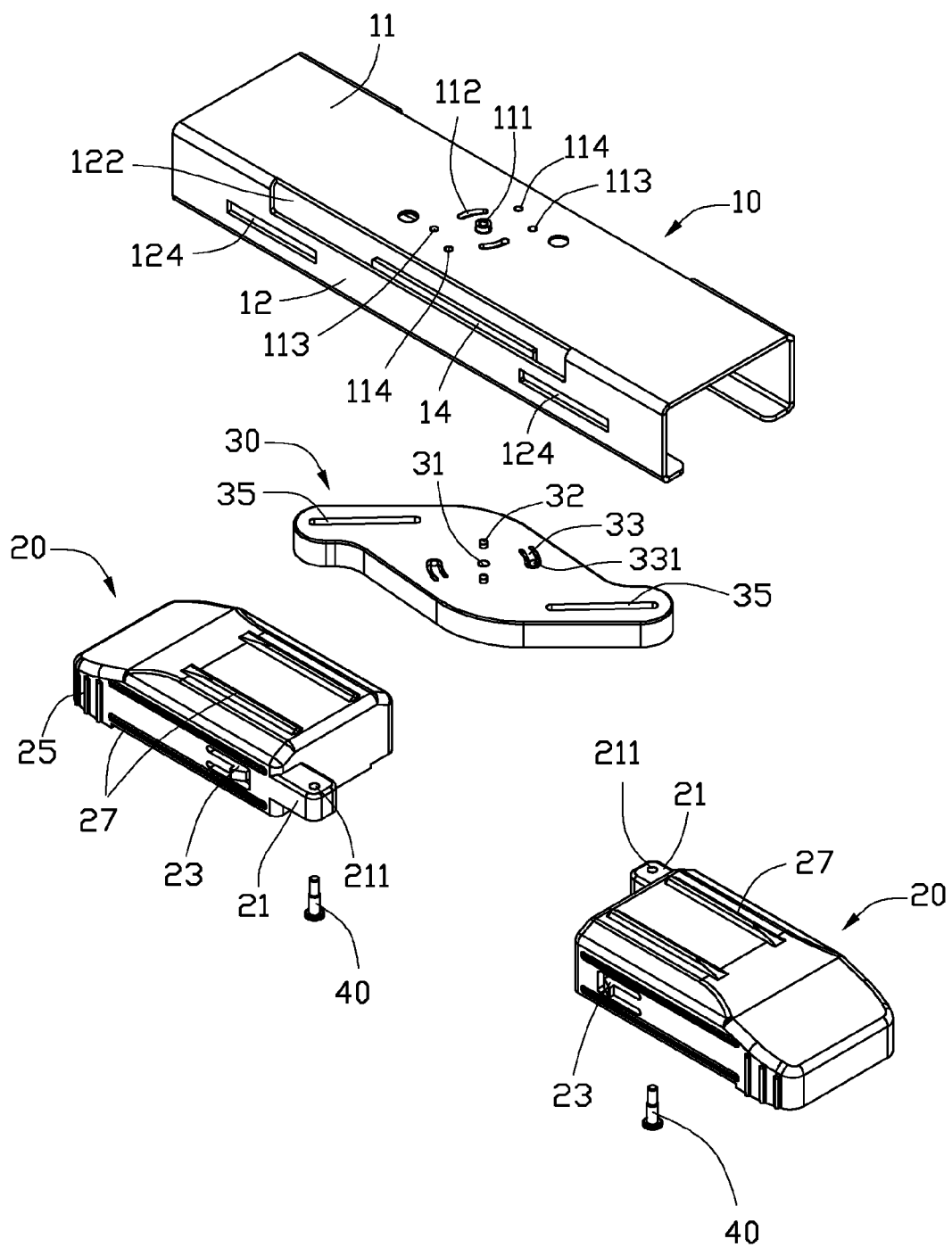
FIG. 1 is an exploded, isometric view of a first exemplary embodiment of a supporting apparatus.
Figure 2:
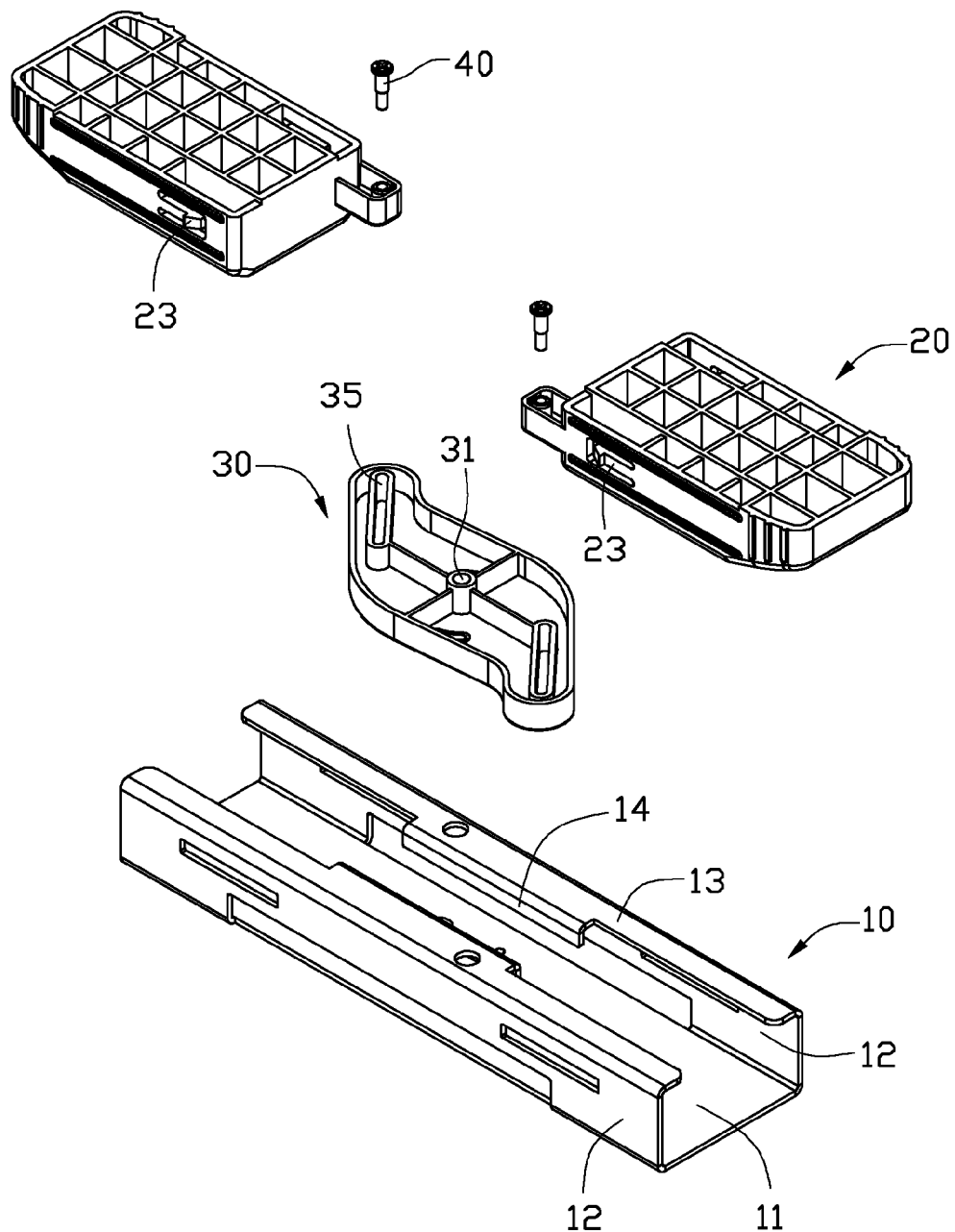
FIG. 2 is an inverted view of FIG. 1.

Referring to FIG. 1 and FIG. 2, an exemplary embodiment of a supporting apparatus includes a supporting member 10, two movable members 20, and a pivot member 30.

The supporting member 10 is made in metal, and has a substantially U-shaped section. The supporting member 10 includes a main plate 11, two side plates 12 perpendicularly extending from the main plate 11, and two flanges 13 respectively perpendicularly extending inward from the side plates 12 opposite to the main plate 11. A supporting plate 14 perpendicularly extends toward the main plate 11 from each flange 13, opposite to the side plate 12. A mounting rod 111 is formed on a center of the main plate 11. Two arc-shaped limiting slots 112 are defined in the main plate 11 and opposite to each other around the mounting rod 111. Two first positioning holes 113 are defined in the main plate 11 and opposite to each other around the mounting rod 111. Two second positioning holes 114 are defined in the main plate 11 and opposite to each other around the mounting rod 111.

Each side plate 12 defines a through slot 122 adjacent to the main plate 11. Two limiting slots 124 are defined in each side plate 12, below the through slot 122.

Each movable member 20 includes a connecting portion 21 extending from an end of the movable member 20. A through hole 211 is defined in the connecting portion 21. An operation portion 25 is formed from each movable member 20 and opposite to the connecting portion 21. A plurality of skid-proof ribs is formed on the operation portion 25. Two resilient hooks 23 are formed from opposite sides of each movable member 20. A plurality of bars 27 are formed on the movable member 20 along a sliding direction of the movable member 20.

The pivot member 30 is substantially shuttle shaped and defines a pivot hole 31 in a center of the pivot member 30. Two pins 32 are formed on the pivot member 30 and opposite to each other around the pivot hole 31. The pivot member 30 defines two U-shaped slots to form two resilient tongue portions 33. A protrusion 331 extends on a distal end of each tongue portion 33. Two parallel elongated slide slots 35 are defined in two opposite ends of the pivot member 30 and opposite to each other around the pivot hole 31. The slide slots 35 are angled with the sliding direction of the movable members 20.

Figure 3:
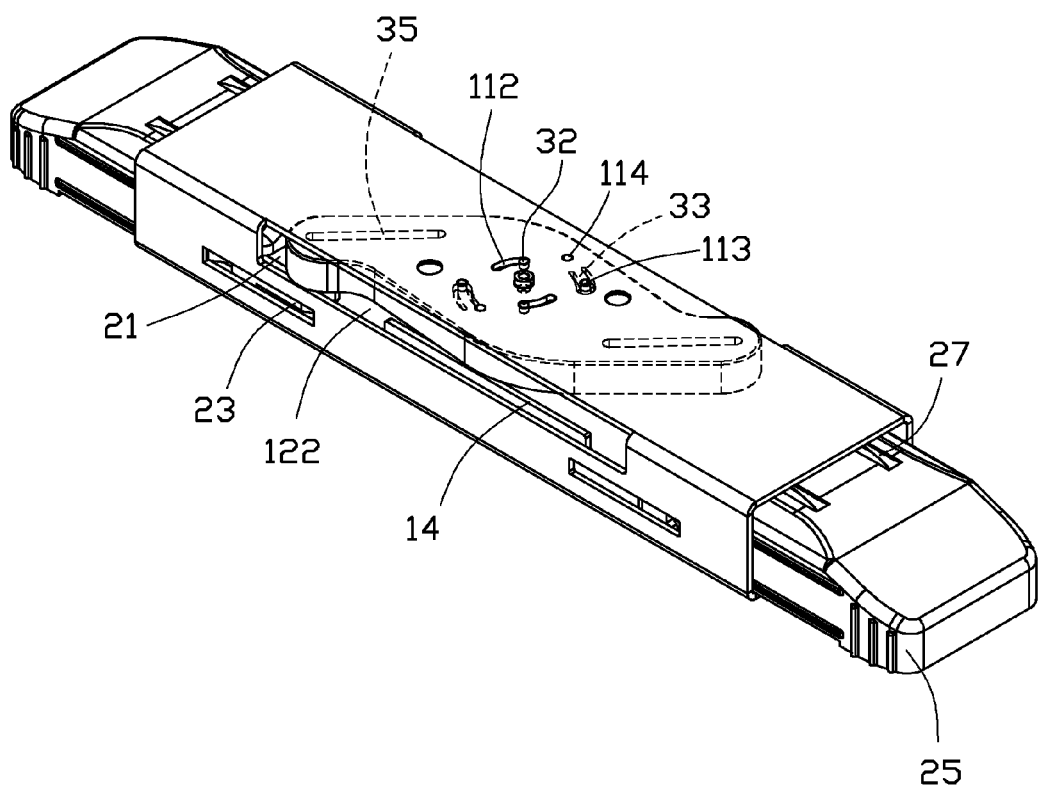
FIG. 3 and FIG. 4 are assembled, isometric views of FIG. 1, but showing different states of use.
Figure 4:
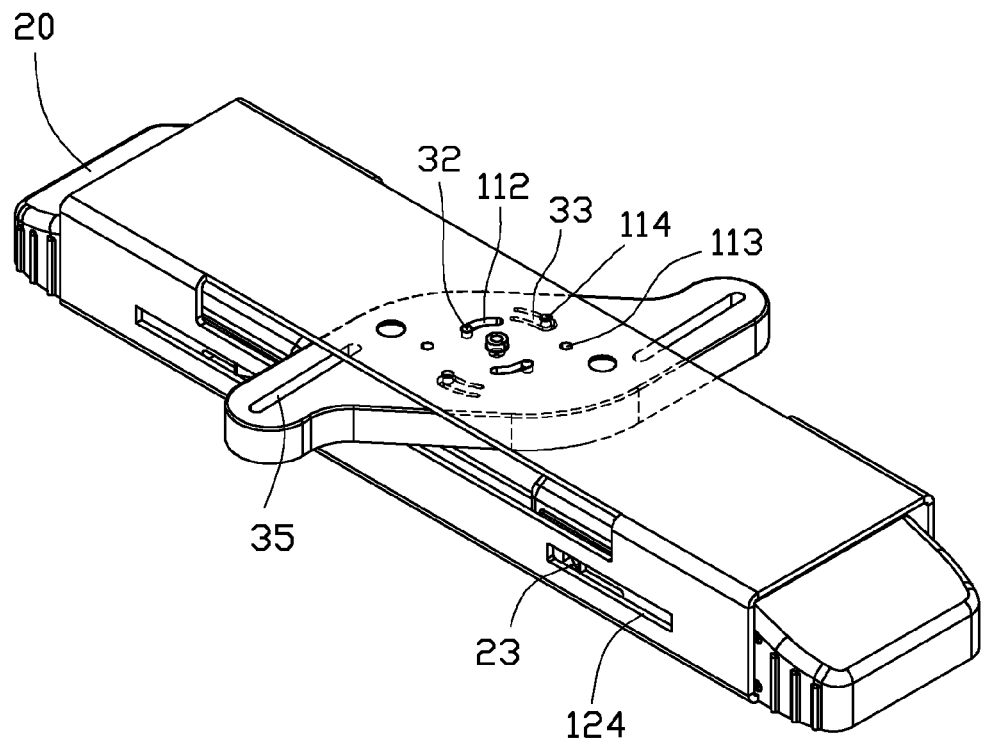

Referring to FIGS. 3 and 4, in assembly, the pivot member 30 is arranged in the supporting member 10 and is supported on the supporting plates 14 with opposite sides of the pivot member 30. A screw (not shown in figures) extends through the pivot hole 31 of the pivot member 30 to screw to the mounting rod 111 of the supporting member 10, thereby the pivot member 30 is pivotably received in the supporting member 10. The pins 32 of the pivot member 30 are slidably received in the limiting slots 112 of the supporting member 10, respectively. The movable members 20 are received in the supporting member 10 from opposite ends of the supporting member 10, between the main plate 11 and the pivot member 30. Two fasteners 40 extend through the through holes 211 of the connecting portions 21 of the movable members 20 to slidably engage in the slide slots 35, respectively. The resilient hooks 23 of each movable member 20 are locked in the limiting slots 124 of the side plates 12 of the supporting member 10, for limiting the movable member 20 relative to the supporting member 10. In this embodiment, the fasteners 40 may be shafts or bolts.

Referring to FIG. 3, in use, the operation portion 25 of one movable member 20 is operated to move out the movable member 20. The movable member 20 drives the fastener 40 to slide in the slide slot 35 away from the pivot hole 31 of the pivot member 30, to rotate the pivot member 30. The sidewall of the other slide slot 35 of the pivot member 30 drives the corresponding fastener 40 to move out the other movable member 20. Until the pins 32 of the pivot member 30 engage with first ends of the limiting slots 112 respectively, the protrusions 331 of the tongue portions 33 of the pivot member 30 are locked in the first positioning holes 113 of the supporting member 10.

Referring to FIG. 4, in not use, the operation portion 25 of one movable member 20 is operated to move in. The movable member 20 drives the fastener 40 to slide in the slide slot 35 toward the pivot hole 31 of the pivot member 30, to rotate the pivot member 30. The sidewall of the other slide slot 35 of the pivot member 30 drives the fastener 40 to move in the other movable member 20. Until the pins 32 of the pivot member 30 engage with second ends of the limiting slots 112 respectively, the protrusions 331 of the tongue portions 33 of the pivot member 30 are locked in the second positioning holes 114 of the supporting member 10.

In the disclosure, the ribs 27 of the movable members 20 are arranged between the movable members 20 and the supporting member 10 to reduce friction areas. The through slots 122 of the side plates 12 of the supporting member 10 are used for avoiding interference from the pivot member 30 with the side plates 12 when pivoting.

In the disclosure, the supporting apparatus includes a pivot member 30 to connect two movable members 20, the movable members 20 can move out or in by operating the movable members 20, which is convenient to use.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A supporting apparatus comprising:
a supporting member;
two movable members movably received in the supporting member from opposite ends of the supporting member, each of the movable members comprising a connecting portion; and
a pivot member pivotably attached to the supporting member and arranged between the movable members, two slide slots defined in opposite sides of the pivot member, wherein the connecting portions of the movable members are movably connected in the slide slots of the pivot member, respectively;
wherein one of the movable members is operated to move in, the connecting portion of the one of the movable members slides in one of the slide slots of the pivot member to rotate the pivot member, a sidewall of the other of the slide slots of the pivot member drives the connecting portion of the other one of the movable member to move in.

2. The supporting apparatus of claim 1, wherein the supporting member comprises a main plate, two side plates perpendicularly extending from the main plate, and two flanges respectively extending inward from the side plates, a supporting plate extends toward the main plate from each of the flanges, the pivot member is supported on the supporting plates.

3. The supporting apparatus of claim 2, wherein a mounting rod is formed on a center of the main plate, the pivot member defines a pivot hole in a center of the pivot member, the pivot member is pivotably attached to the supporting member through the mounting rod rotatably engaged in the pivot hole.

4. The supporting apparatus of claim 3, wherein two arc-shaped limiting slots are defined in the main plate and opposite to each other around the mounting rod, two pins are formed on the pivot member and opposite to each other around the pivot hole, the pins of the pivot member are movably received in the limiting slots of the supporting member.

5. The supporting apparatus of claim 3, wherein two first positioning holes are defined in the main plate and opposite to each other around the mounting rod, two second positioning holes are defined in the main plate and opposite to each other around the mounting rod, the pivot member forms two resilient tongue portions, two protrusions extend on distal ends of the tongue portions to selectively engage in the first positioning holes or the second positioning holes.

6. The supporting apparatus of claim 2, wherein two limiting slots are defined in each of the side plates, two resilient hooks are formed from opposite sides of each of the movable members, the resilient hooks of the movable member are movably engaged in the limiting slots of the side plates of the supporting member, for limiting the movable members relative to the supporting member.

7. The supporting apparatus of claim 1, wherein the slide slots are parallel and opposite to each other around the pivot hole, the slide slots are angled with the sliding direction of the movable members.

8. The supporting apparatus of claim 1, wherein a through hole is defined in each of the connecting portions, two fasteners extend through the through holes of the connecting portions of the movable member to movably engage in the slide slots of the pivot member.

9. A supporting apparatus comprising:
a supporting member;
two movable members slidably received in the supporting member; and
a pivot member pivotably attached to the supporting member and arranged between the movable members;
wherein when operate one of the movable members to move relative to the supporting member, the movable member drives the pivot member to pivot, the pivot member drives the other movable member to move.

10. The supporting apparatus of claim 9, wherein the supporting member comprises a main plate, two side plates perpendicularly extending from the main plate, and two flanges respectively extending inward from the side plates, a supporting plate extends toward the main plate from each of the flanges, the pivot member is supported on the supporting plates.

11. The supporting apparatus of claim 10, wherein a mounting rod is formed on a center of the main plate, the pivot member defines a pivot hole in a center of the pivot member, the pivot member is pivotably attached to the supporting member through the mounting rod rotatably engaged in the pivot hole.

12. The supporting apparatus of claim 11, wherein two arc-shaped limiting slots are defined in the main plate and opposite to each other around the mounting rod, two pins are formed on the pivot member and opposite to each other around the pivot hole, the pins of the pivot member are slidably received in the limiting slots of the supporting member.

13. The supporting apparatus of claim 11, wherein two first positioning holes are defined in the main plate and opposite to each other around the mounting rod, two second positioning holes are defined in the main plate and opposite to each other around the mounting rod, the pivot member forms two resilient tongue portions, two protrusions extend on distal ends of the tongue portions to selectively engage in the first positioning holes or the second positioning holes.

14. The supporting apparatus of claim 10, wherein two limiting slots are defined in each of the side plates, two resilient hooks are formed from opposite sides of each of the movable members, the resilient hooks of the movable member are slidably locked in the limiting slots of the side plates of the supporting member, for limiting the movable members relative to the supporting member.

15. The supporting apparatus of claim 9, wherein each of the movable members comprises a connecting portion, a through hole is defined in each of the connecting portions, two slide slots are defined in opposite sides of the pivot member, two fasteners extend through the through holes of the connecting portions of the movable member to slidably engage in the slide slots of the pivot member.

16. The supporting apparatus of claim 15, wherein the slide slots of the pivot member are parallel and opposite to each other around the pivot hole, the slide slots are angled with the sliding direction of the movable members.

* * * * *